Dec. 23, 1958

C. J. PENTHER ET AL 2,865,197

MICROVISCOMETER

Filed June 18, 1956

INVENTORS:
C. J. PENTHER
R. L. GRIFFIN
T. K. MILES
W. C. SIMPSON

BY: A. H. McCarthy
THEIR AGENT

Dec. 23, 1958　　　C. J. PENTHER ET AL　　　2,865,197
MICROVISCOMETER
Filed June 18, 1956　　　　　　　　　　　2 Sheets-Sheet 2

INVENTORS:
C. J. PENTHER
R. L. GRIFFIN
T. K. MILES
W. C. SIMPSON
BY: J. H. McCarthy
THEIR AGENT

2,865,197
MICROVISCOMETER

Carl J. Penther and Raymond L. Griffin, Oakland, Thomas K. Miles, Orinda, and Warren C. Simpson, Berkeley, Calif., assignors to Shell Development Company, New York, N. Y., a corporation of Delaware Application June 18, 1956, Serial No. 592,126

5 Claims. (Cl. 73—58)

This invention relates to a viscometer and pertains more particularly to a very sensitive viscometer for measuring viscosities of asphalt-like materials and plastics over a wide range of shear rates at pre-determined constant temperatures.

There has long been a need for a viscometer capable of measuring the viscosity of asphalts, asphalt-like materials and plastics under conditions similar to those encountered during the actual use of these materials. In studying asphalts which are used in highway construction, many authors have agreed that it is best to work with thin films of material which approach the film thickness of asphalt in roads and highways. To do this it is necessary to be able to measure the viscosity of thin films of asphalt in the range of from 5 to 20 microns (.005–.02 mm.).

Aging of asphalt is both a chemical and physical problem. Recently reported studies show that oxygen diffuses into a very thin top layer of the asphalt. Thus, it is desirable to examine asphalts by exposing layers of about 5 micron thickness to air rather than studying much thicker layers. Since only small quantities of material are available after a 5 micron film had been subjected to aging, a microviscometer is needed to measure the viscosity of this small amount of asphalt. Such an instrument should require the use of not more than about 10 mg. of asphalt for test purpose.

It is therefore the primary object of the present invention to provide a microviscometer capable of measuring the viscosity of very small amounts and very thin films of asphalt-like materials.

Since some asphalts, being non-Newtonian fluids, display different viscosities at different shear rates when measured at the same temperature, it is a further object of this invention to provide a microviscometer capable of measuring viscosities of plastic- or asphaltic-like materials in the range of from $10^2$ to $10^{11}$ poises, said measurements being taken at constant predetermined temperatures and at selected shear rates.

Another object to this invention is to provide a very sensitive microviscometer capable of accurately recording viscosities when actuated by weights ranging from 0.1 g. to 10 kilograms or more.

These and other objects of this invention will be understood from the following description taken with reference to the drawing, wherein.

Figure 1:
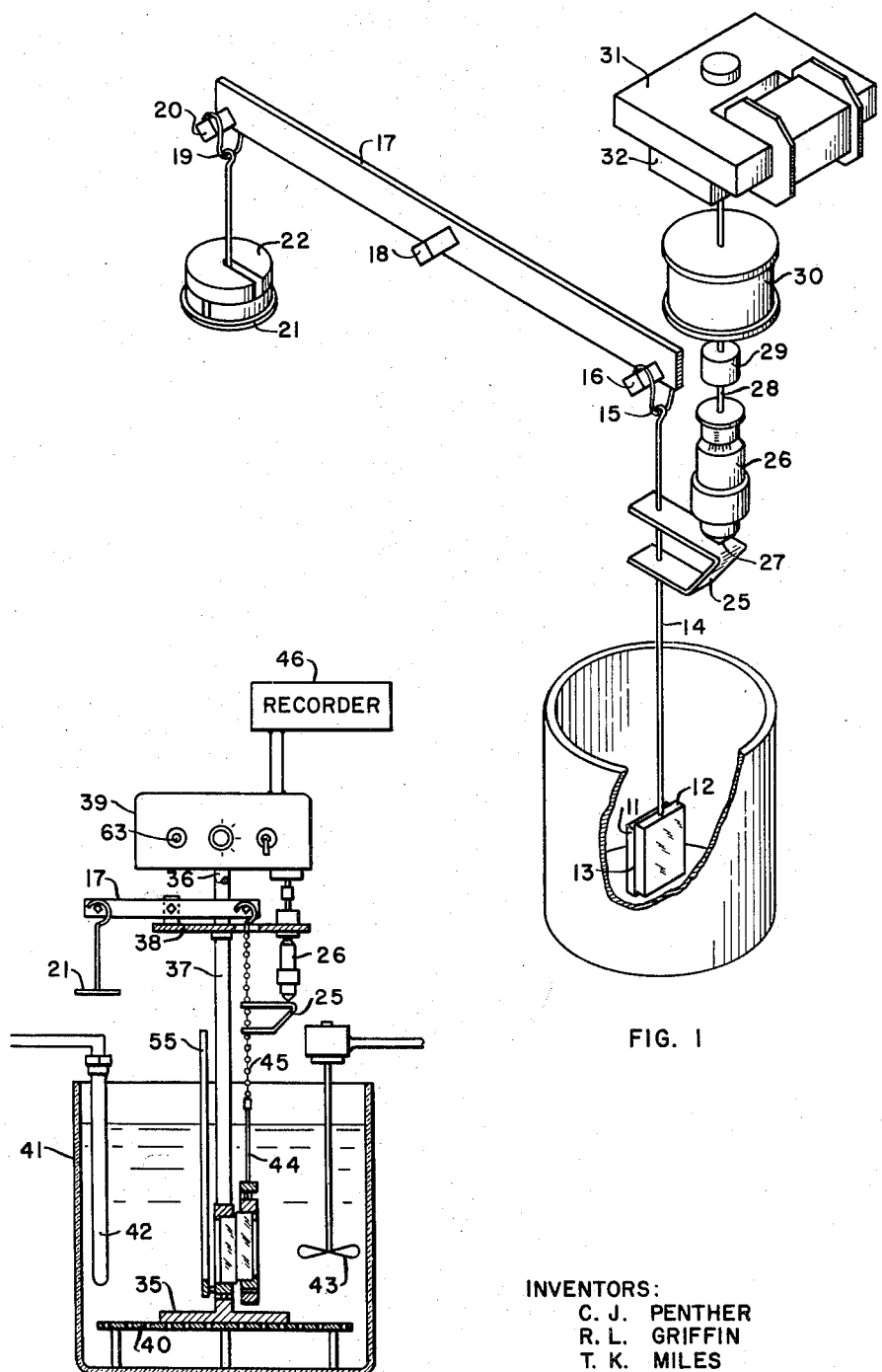
Figure 1 is a schematic view illustrating the principal components of the present viscometer system.

The present microviscometer is shown in Figure 1 as comprising a pair of plates 11 and 12 adapted to hold between them a thin layer 13 of viscous material, for example asphalt, on which viscosity readings are to be made. The two plates 11 and 12 are preferably made of transparent material, such as polished flat Pyrex glass. A convenient size for the plates has been found to be 20 mm. x 30 mm. with the glass being from ¼ to ½" thick with squared edges.

One plate 11 is fixedly positioned, in a manner to be described hereinbelow, while the second plate 12 is mounted for sliding movement across the face of the fixed plate 11. Suitable linkage means, such as a string or cable 14, is fixedly secured to the sliding glass plate 12 and extends upwardly to a hook 15 resting on a knife-edge 16 at one end of a beam 17 which is balanced on knife-edge 18. A hook 19 rests on a knife-edge 20 at the other end of the beam 17 for supporting a weight pan 21 on which weights 22 may be positioned. In order to possess sufficient sensitivity to handle weights of about 0.1 g., while at the same time being rugged enough to handle weights of 10 kilograms or more without becoming dull, it has been found necessary to employ knife-edges having a contact or balance angle of about 90°.

Fixedly positioned on the cable 14 is a flag 25 made of a conductive metal. Mounted directly above the flag 25 is a micrometer 26 whose point 27 is arranged to make electrical contact with the surface of the flag 25. The rotatable shaft 28 of the micrometer is connected by means of an insulating coupling 29 to a potentiometer 30 adapted to be rotated by motor 31 through a speed reducer 32. The knife-edge 18 of the beam 17 is preferably mounted in an agate bearing. While a sheave or pulley could replace the beam 17 when tests are being run using larger weights, it has been found that a pulley arrangement is not sensitive enough when very small weights are being used.

Figure 2:
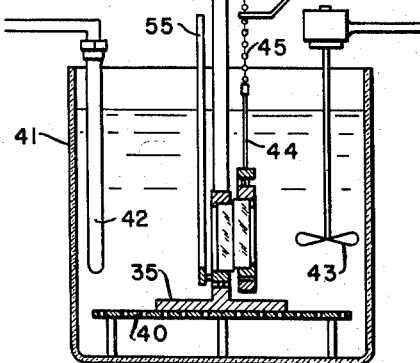
Figure 2 is a view of the present microviscometer when positioned in a constant temperature bath and connected to a recorder.

Referring to Figure 2, the present microviscometer is shown as being mounted in a stand comprising a base 35 having two upright columns 36 and 37 standing upwardly therefrom in spaced relationship. The beam 17 is mounted on a platform 38 secured to the top of the columns 36 and 37. The micrometer 26 is also secured to the platform 38 with the control circuits of the microviscometer being contained in a box 39 at the top of the columns 36 and 37. The cable 14 of Figure 1 is adapted to be positioned between the columns 36 and 37, and is shown in the form of elements 44 and 45 to be described below.

The entire microviscometer is placed on a perforate plate 40 which is located above the bottom of a constant temperature bath 41 to permit circulation. The bath 41 is provided with suitable heating elements 42 and agitation or circulation means 43 whereby the bath may be maintained at a constant temperature. In order that the operator need not immerse his hands in the bath while positioning the glass plates 11 and 12 in place, the cable 14 (Fig. 1) preferably comprises a length of thin, fairly rigid rod 44 extending above the water level of the bath 41 at which point it is connected by means of a flexible chain or cable 45 to the hook 15 (Fig. 1). A suitable recorder 46 is provided, such for example as a millivolt G-10 Graphic Recorder, manufactured by Varian Associates, Palo Alto, California.

Figure 4:
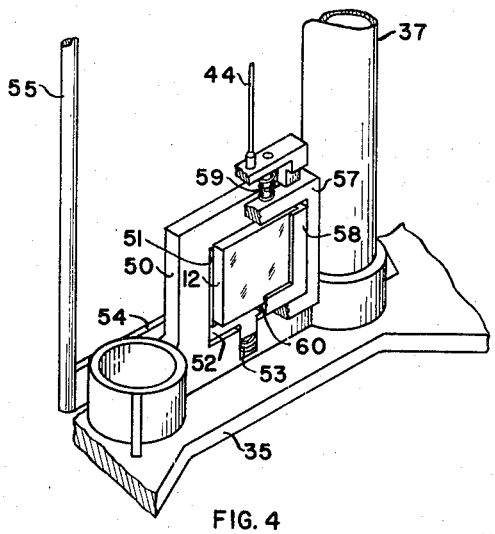
Figure 4 is a view, taken partially in cross-sectional detail, of the plate holders used with the present apparatus.

In Figure 4, a frame 50 containing the fixed glass plate 11 of Figure 1 is shown fixedly secured to or forming an integral part of the base 35 of the microviscometer. The thickness or the depth of the recessed portion or window 51 of the frame 50 is slightly less than the thickness of the glass plate 11, which causes the surface of the plate 11 in contact with plate 12 to lie to one side of the surface of the frame 50, thus permitting the plates 11 and 12 to slide freely of the frame relative to one another. The lower horizontal ledge 52 of the window 51 is slidably movable in a vertical direction, being spring-loaded by means of recessed spring 53 to form means for rigidly clamping the fixed glass plate 11 in frame 50. To facilitate opening the spring-loaded section 52 of the frame 50, a lever is pivotally secured to the base 35 and also to movable section 52 and has a lever arm 55 extending upwardly a suitable distance so that the top of the arm is above the water level of the constant temperature bath, as shown in Figure 2.

Second frame 57, somewhat similar to frame 50, surrounds the movable glass plate 12 and is rigidly clamped thereto, while being itself secured to the bottom of rod 44. The frame 57 is provided with an inner movable frame 58 which is held in tension against the edges of the glass plate 12 by means of one or more springs 59. The recessed portion or window 60 of the movable frame 58 has a depth or thickness of less than the thickness of plate 12 adapted to be positioned therein. Thus, with the contacting faces of the plates 11 and 12 extending slightly beyond the surfaces of their respective frames 50 and 57, there is no contact of the frames which would cause friction and introduce errors into the viscosity readings.

In using the present microviscometer to determine the viscosity of an asphalt at a constant pre-determined temperature, a warm drop of asphalt is placed on one of the plates 11 or 12. The sample is worked to a thin layer between the previously weighed plates by putting the two plates face-to-face and pressing the warm drop of asphalt between them. The film thickness of the sample used between the plates is normally in the range of from about 10 to 200 microns. The plates are pressed and worked together until a homogenous layer of sample is obtained between them. Homogeneity of the film is determined by observing the uniformity of color in light transmitted through the plates and film when they are held over a light source. The edges of the plates are then cleaned if necessary by first scraping off any asphalt squeezed out on the edges with a razor blade and then cleaning the exposed portions of the plate with benzene. The thickness of the film layer is then determined by weighing the plates and film on an analytical balance to 0.1 mg.

With the two plates 11 and 12 held together by the layer of asphalt sample 13 between them one of the plates is inserted in frame 57 and rigidly clamped therein by movable frame 58. The frame 57 together with the rod 44 (Fig. 4) is lowered into the constant temperature bath 41. Lever arm 55 is depressed to actuate lever 54 which presses movable section 52 of frame 50 down against spring 53 thereby opening the window 51 of frame 50 so that the other glass plate 11 can be inserted therein. With glass plate 11 in place, lever arm 55 is released and the chain 45 of the top of rod 44 (Fig. 2) is connected to the hook 15 (Fig. 1) on the end of beam 17. The sample to be tested normally reaches test temperature within 5 minutes after being placed in the bath.

Prior to adding any weights to the weight pan 21, a switch 63 (Figs. 2 and 3) on the control box 39 is actuated to energize the motor 31 (Fig. 1) which rotates the micrometer 26 and runs it down until it touches the surface of the flag 25.

When a weight 22 (Fig. 2) of from 0.1 g. to 10 kilograms is placed on the weight pan 21, the plate 12 starts to move upwardly sliding against plate 11 so that shear takes place in the layer of material between the glass plates. The displacement of the glass plates 11 and 12 with respect to each other is normally limited to a maximum of 10% of their length, or 1.5 mm., so that the change in shearing stress caused by the reduction in contact area of the two plates remains below this limit. For most paving asphalts, the displacement need be only 0.1 mm. for each shearing stress. Larger displacements may be necessary in some cases if the rate of shear is changing with time. If a set of viscosity determinations are not completed before 1.5 mm. movement of plate 12 has taken place, the plates 11 and 12 may be reversed in the frames 50 and 57 and the plates then pulled in the opposite direction. If it is desired to eliminate the error introduced by the change in contact area of two plates 11 and 12 of equal size, the movable plate 12 may be used that is shorter than the fixed plate 11 so that the entire surface of the movable plate is always in contact with the fixed plate.

The displacement of the glass plates 11 and 12 with respect to one another can be measured visually by periodically reading and recording changes in the reading on the scale of the micrometer 26. Preferably, an electronic circuit is provided which can be connected to a recorder 46 for recording displacement versus time. For example, a 0.5 mm. displacement of the glass plates may be magnified to a 5" movement on the chart of the recorder 46 used with the microviscometer. Normally a movement of 0.1 mm. is all that is needed for one viscosity determination. Measurements at four different shear rates, that is with four different weights applied to the weight pan 21, can be made in one chart width. Complete viscosity measurements of an 85/100 penetration asphalt may be made at four different shear rates at 77° F. in less than 15 minutes.

Figure 3:
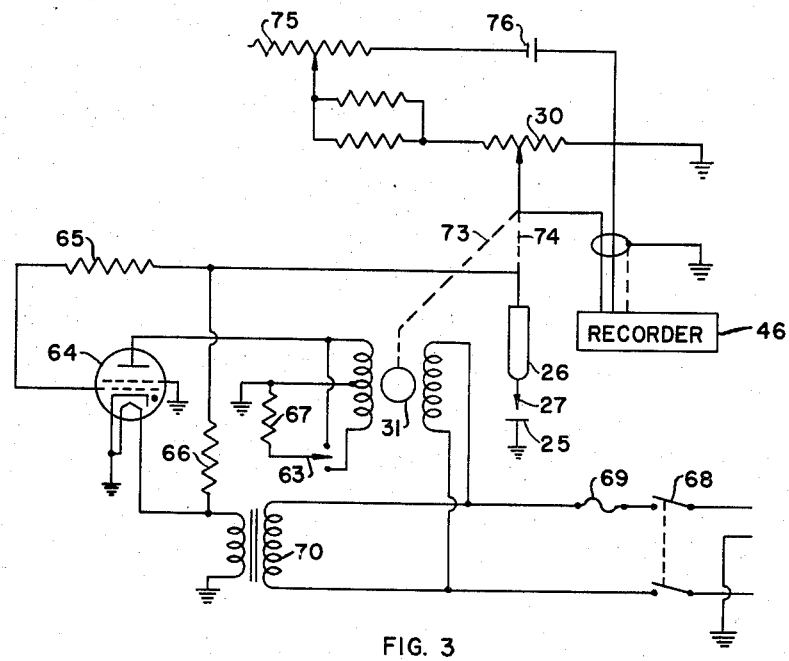
Figure 3 is a typical circuit diagram provided for actuating and controlling the operation of the present viscometer.

A typical electronic circuit for measuring the displacement of the sliding plates 11 and 12 with respect to each other is shown in Figure 3 as a servo system comprising a thyratron tube 64, a reversible shaded pole motor 31, resistances 65, 66 and 67, switch 63, main power switch 68, fuse 69 and transformer 70. The mechanical connection between the motor 31, potentiometer 30 and the micrometer 26 is shown by broken lines 73 and 74. Variable resistance 75 and mercury cell 76 furnish an analog voltage proportional to the micrometer displacement. A 360° travel of the potentiometer is equal to the full span (0–100 millivolts) of the recorder 46.

The motor 31 drives the insulated micrometer 26 and causes it to maintain a high-resistance contact with the flag 25 which moves upwardly with the slidable glass plate 12. The contact force of the following mechanism point 27 on the flag 25 is not significant over the range of viscosities covered. Resistance 67 and switch 40 provide for manual operation of the motor driven micrometer 26. Resistance 67 prevents overtravel of the micrometer in a downward direction toward the flag 25. When the contact point 27 of the micrometer 26 touches the flag 25, the motor 31 stops and when switch 40 is released the motor reverses to back off the micrometer contact point 27 thereby establishing the correct operating resistance between the flag 25 and the contact point 27, which resistance is thereafter maintained throughout the test.

The flag 25 is grounded in any suitable manner. Preferably, the conductivity of the water in the bath 41 (Fig. 2) is utilized to ground the flag in completing the circuit between the flag and the thyratron cathode. The thyratron 64 operates the motor 32 to drive the micrometer up or down. Resistance 66 and the operating resistance between the flag 25 and the contact 27 of the micrometer 26 provide a voltage dividing network for the grid signal voltage supplied by transformer 70.

As the weight 22 (Fig. 1) on the pan 21 is continually applied to the beam 17, sliding plate 12 continues to move upwardly together with flag 25. As the flag 25 moves up closer to the contact point 27 of the micrometer 26, the pressure between the contact point and the flag is increased a minute amount thus lowering the resistance between the flag and the contact point which causes the thyratron 64 to fire and produce rotation of the motor 31, which in turn rotates the micrometer to raise or back-off the contact point 27 approximately 1/10000 of an inch, once again establishing the pre-determined operating resistance between the flag and the micrometer. As soon as the micrometer backs off approximately 1/10000 of an inch, the resistance increases so that sufficient bias voltage is supplied to stop the thyratron from firing, stopping the motor 31. When the weight 22 again pulls the plate 12 and flag 25 upwardly, resistance decreases between the flag and the contact point to cause the thyratron to fire again and start the motor.

The stepwise motion described above is in the order of 1- to 2/10000 of an inch per step, generally about 7 steps per 1/10000 of an inch. While the change in position of the flag and micrometer contact point 27 are utilized to change a resistor in the circuit for measuring displacement of the sliding glass plates 11 and 12 with respect to each other, it is realized that a small horizontal plate may be secured to the contact point 27 parallel to the flag 25 whereby change in the relative position of flag 25 and contact 27 would change the spacing between them. To measure any change in position of the flag and the horizontal plate, they are connected as a capacitor into suitable capacitance-actuated servo-drive circuit.

We claim as our invention:

1. A microviscometer for determining viscosities of small amounts of plastics and asphalt-like substances, said apparatus comprising a pair of smooth-surfaced plates adapted to be mounted in face-to-face contact with each other and to receive between them a thin film of material to be tested, first holding means fixedly securing one of said plates against movement, second holding means fixedly secured to said other plate and arranged for sliding movement parallel to, but out of contact with, said first holding means, linkage means attached to said second holding means, means for applying a pre-determined force to said linkage means to slide one of the plates over the other and in contact therewith, a flag secured in fixed relationship with said linkage means and movable with said linkage means and one of the plates, electrical circuit means including said flag as a movable control element, and measuring means coupled to said circuit means for measuring the displacement of said flag and said movable plate with respect to the other plate.

2. A microviscometer for determining viscosities of small amounts of plastics and asphalt-like substances, said apparatus comprising a pair of smooth-surfaced plates adapted to be mounted in face-to-face contact with each other and to receive between them a thin film of material to be tested, first holding means fixedly securing one of said plates against movement, second holding means fixedly secured to said other plate and arranged for sliding movement parallel to, but out of contact with, said first holding means, linkage means attached to said second holding means, means for applying a pre-determined force to said linkage means to slide one of the plates over the other and in contact therewith, a flag secured in fixed relationship with said linkage means and movable with said linkage means and one of the plates, electrical circuit means comprising said flag as a movable control element for hanging the setting of said circuit means in response to the motion of said flag, and a recorder coupled to said circuit means for recording said change of setting.

3. A microviscometer for determining viscosities of small amounts of plastics and asphalt-like substances, said apparatus comprising a pair of smooth-surfaced transparent plates adapted to be mounted in face-to-face contact with each other and to receive between them a thin film of material to be tested, first holding means fixedly securing one of said plates against movement, second holding means fixedly secured to said other plate and arranged for sliding movement parallel to, but out of contact with, said first holding means, linkage means attached to said second holding means, means for applying a pre-determined force to said linkage means to slide one of the plates over the other and in contact therewith, a flag secured in fixed relationship with said linkage means and movable with said linkage means and one of the plates, electrical circuit means including said flag as a movable control element, and micrometer means mechanically and electrically coupled to said circuit means for measuring the displacement of said flag and said movable plate with respect to the other plate.

4. A microviscometer for determining viscosities of small amounts of plastics and asphalt-like substances, said apparatus comprising a pair of smooth-surfaced transparent plates adapted to be mounted in face-to-face contact with each other and to receive between them a thin film of material to be tested, vertically-positioned first holding means fixedly securing one of said plates against movement, second holding means fixedly secured to said other plate and arranged for sliding vertical movement parallel to, but out of contact with, said first holding means, linkage means attached to said second holding means, a balance beam mounted above said holding means having one end thereof secured to said linkage means, a weight pan secured to the other end of said balance beam for applying a pre-determined force to said linkage means to slide one of the plates vertically with regard to the other and in contact therewith, a flag secured in fixed relationship with said linkage means and movable with said linkage means and one of the plates, electrical circuit means including said flag as a movable control element, and micrometer means mechanically and electrically coupled to said circuit means for measuring the displacement of said flag and said movable plate with respect to the other plate.

5. A microviscometer for determining viscosities of small amounts of plastics and asphalt-like substances, said apparatus comprising a pair of smooth-surfaced transparent plates adapted to be mounted in face-to-face contact with each other and to receive between them a thin film of material to be tested, vertically-positioned first holding means fixedly securing one of said plates against movement, second holding means fixedly secured to said other plate and arranged for sliding vertical movement parallel to, but out of contact with, said first holding means, linkage means attached to said second holding means, a balance beam mounted above said holding means having one end thereof secured to said linkage means, a weight pan secured to the other end of said balance beam for applying a pre-determined force to said linkage means to slide one of the plates vertically with regard to the other and in contact therewith, a flag secured in fixed relationship with said linkage means and movable with said linkage means and one of the plates, electrical circuit means including said flag as a movable control element, micrometer means mechanically and electrically coupled to said circuit means for measuring the displacement of said flag and said movable plate with respect to the other plate, a recorder coupled to said circuit means for recording displacement of said plates with time, and a constant temperature bath surrounding at least said plates and the material therebetween.

References Cited in the file of this patent

UNITED STATES PATENTS

| | | |
|---|---|---|
| 1,894,369 | Duffing | Jan. 17, 1933 |
| 2,091,534 | Templin et al. | Aug. 31, 1937 |
| 2,182,082 | Hayden et al. | Dec. 5, 1939 |
| 2,483,333 | Cannon et al. | Sept. 27, 1949 |
| 2,747,399 | Foreman | May 29, 1956 |